United States Patent [19]

Chang et al.

[11] 4,342,636
[45] Aug. 3, 1982

[54] PROCESS FOR FORMING A POROUS POLYFLUOROALKYLENE SHEET USEFUL FOR SEPARATING ANOLYTE FROM CATHOLYTE IN ELECTROLYTIC CELLS

[75] Inventors: Eng-Pi Chang, Grand Island; Christine A. Lazarz; Edward H. Cook, Jr., both of Niagara Falls, all of N.Y.

[73] Assignee: Hooker Chemicals & Plastics Corp., Niagara Falls, N.Y.

[21] Appl. No.: 277,532

[22] Filed: Jun. 26, 1981

Related U.S. Application Data

[62] Division of Ser. No. 64,615, Aug. 7, 1979, Pat. No. 4,292,146.

[51] Int. Cl.³ .................... C25B 13/02; C25B 13/08; C25B 13/04
[52] U.S. Cl. ........................................ 204/296; 264/49
[58] Field of Search ........................... 264/49; 204/296

[56] References Cited
U.S. PATENT DOCUMENTS 3,890,417 6/1975 Vallance ............................... 264/49
4,003,818 1/1977 Juillard et al. ......................... 264/49
4,250,002 2/1981 Lazarz et al. ........................ 204/296
4,256,845 3/1981 Morris et al. ........................... 264/49
4,289,600 9/1981 Lazarz et al. .......................... 264/49

Primary Examiner—R. L. Andrews
Attorney, Agent, or Firm—Howard M. Ellis

[57] ABSTRACT

A porous polyfluoroalkylene sheet, very preferably of polytetrafluoroethylene, which is suitable for use as a separator in an electrolytic cell, such as one used for the electrolysis of brine, has a porosity in the range of 70 to 90%, a thickness in the range of 0.2 to 3.5 mm. and at least one of (a) an A X-ray ratio in the range of 0.1 to 0.35 and (b) a B X-ray ratio in the range of 0.75 to 0.98. Preferably the A X-ray ratio is in the range of 0.1 to 0.3, the $B_2$ X-ray ratio is in the range of 0.75 to 0.98 and the $B_1$ X-ray ratio is in the range of 0.1 to 0.32. The porous sheets are incorporated in separators or diaphragms for electrolytic cells and the uses of such separators and cells in electrolysis processes, preferably in the electrolysis of brine, are described. Also shown in the specification are a method for the manufacture of the porous sheets and a method for ascertaining which milled, sintered and leached porous sheets are more suitable for use in electrolytic processes.

6 Claims, 6 Drawing Figures

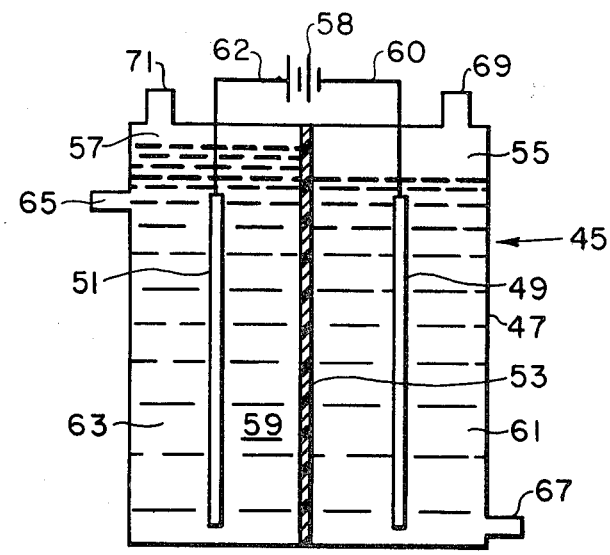
FIG. 3
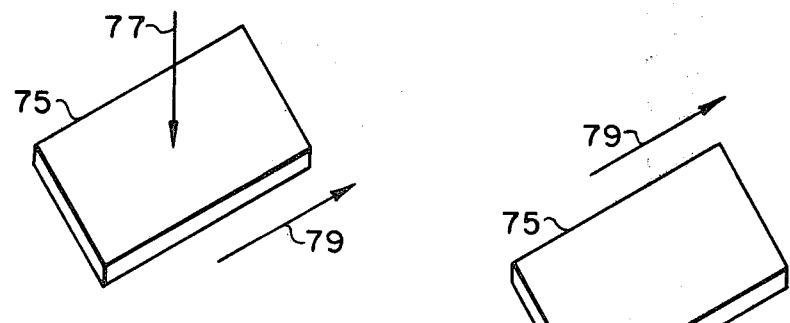
FIG. 4
FIG. 5
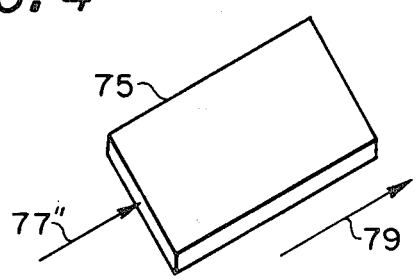
FIG. 6

PROCESS FOR FORMING A POROUS POLYFLUOROALKYLENE SHEET USEFUL FOR SEPARATING ANOLYTE FROM CATHOLYTE IN ELECTROLYTIC CELLS

This is a division of application Ser. No. 064,615, filed Aug. 7, 1979, now U.S. Pat. No. 4,292,146.

This invention relates to porous polyfluoro-lower alkylene sheets and to a method for the manufacture thereof. More specifically, it relates to a porous polytetrafluoroethylene sheet suitable for use as a separator in an electrolytic cell, such as one utilized for the electrolysis of brine to produce chlorine and caustic. The sheet made is of sufficient porosity and tensile strength and possesses other desirable physical and chemical characteristics so as to withstand the rigors of use in the environment of the electrolytic cell without premature failure.

Electrolytic cells of the diaphragm type are the principal means for the manufacture of chlorine and caustic from brine. Such chlorine cells have included diaphragms of deposited asbestos to maintain separate anolyte and catholyte compartments about the anode and cathode, respectively. Such diaphragms prevent mixing of the gaseous products of electrolysis, hydrogen and chlorine, allow the flow of brine toward the cathode and diminish the back diffusion of hydroxyl ions into the anolyte.

Because of the presence of some chloride in the caustic withdrawn from the catholyte compartment of the electrolytic cells, due to passage of excess brine through the asbestos diaphragm, and because of governmental restrictions on the use of asbestos, other means have been sought to separate anolyte and catholyte compartments without the creations of unduly high electrical resistances. Permselective polymeric membranes, permeable to either anions or cations, have been employed but in commercial practice these have not been as successful as had been expected. Such membranes are often weak or delicate, subject to oxidative degradation during use and are often of relatively high electrical resistances and of relatively high costs. Accordingly, suitable porous or microporous synthetic organic polymeric diaphragms have been sought which are satisfactorily electrically conductive, chemically resistant to the electrolyte and of desired porosity so that they may function as superior replacements for the prior art asbestos diaphragms.

Among the disclosures of such diaphragms and methods for their manufacture which are considered to be of relevance to the subject of this application are French Pat. No. 1,491,033; U.S. Pat. No. 3,281,511; U.S. Pat. No. 3,518,332; U.S. Pat. No. 3,556,161; U.S. Pat. No. 3,890,417; and U.S. Pat. No. 4,049,589.

French Pat. No. 1,491,033 describes the manufacture of porous diaphragms by mixing together an aqueous dispersion of polytetrafluoroethylene, pore former (starch or calcium carbonate) and inorganic insoluble filler (barium sulfate, titanium dioxide or asbestos), coagulating the dispersion and converting the coagulum into sheet form, after which the pore former is removed. U.S. Pat. No. 3,281,511 teaches the preparation of microporous tetrafluoroethylene resin sheets by mixing together the finely divided resin powder in a Stoddard solvent carrier with a minor amount of leachable particulate material, such as boehmite alumina, milling the mixture to sheet form, drying the sheet to remove the solvent, leaching out the particles (of boehmite alumina), washing the sheet and drying it. U.S. Pat. No. 3,518,332 is for making a microporous fluorocarbon polymer sheet from a mixture of fluorocarbon polymer, metallic salt particles and paraffin wax, removing the wax by treating with a petroleum solvent, sintering the fluorocarbon polymer particles together and leaching out the pore-forming salt. U.S. Pat. No. 3,556,161 describes the manufacture of a polytetrafluoroethylene sheet of certain A and B X-ray ratio characteristics by mixing together powdered polytetrafluoroethylene resin, organic solvent and leachable inorganic particulate pore-forming material, forming a sheet of such mixture and milling the sheet so that the direction of milling is changed in successive steps, after which the sheet is dried to remove the solvent, sintered and leached to remove the inorganic pore-forming material. U.S. Pat. No. 3,890,417 relates to the preparation of an aqueous slurry or dispersion comprising polytetrafluoroethylene and a solid particulate additive material, calendering the mix to a sheet form and soaking it in a solvent for the additive, to remove it. Finally, U.S. Pat. No. 4,049,589 teaches that a porous polytetrafluoroethylene sheet can be made by rolling a sheet made from a mixture of polytetrafluoroethylene resin and lubricant so as to stretch it, after which the resin particles of the sheet are sintered together. The stretching operation is preferably carried out after removal of lubricant from the sheet. When pore-forming materials are present in the stretched sheet they may be removed by solvent extracting, heating, dissolving or other suitable means.

Although the described methods relate to the manufacture of porous polytetrafluoroethylene sheets, it has been found that those produced by the present method and described in this application are of improved physical properties, may be manufactured more efficiently and by automatic machinery and are superior in various other respects to the products and processes of the patents mentioned.

In addition to the prior art discussed above it is considered that U.S. patent applications Ser. Nos. 891,987 and 957,515, in both of which two of the present three inventors are coinventors, are also of interest. Such disclosures are not admitted to be prior art against the present application but are referred to herein as containing relevant information. In the earlier application there is described a method for forming microporous membrane materials by utilizing a fluorosurfactant lubricant with a fluorocarbon polymer powder and a pore-forming particulate material, milling these to a sheet, sintering the fluorocarbon polymer and removing the particulate pore-forming material. In the latter application a separator is described which results in higher current efficiencies in the operation of an electrolytic cell. Such separator has specified porosity, thickness, hysteresis characteristics and pore size distributions. In such latter application the manufacture and use of such separator are also disclosed. It is considered that the present invention also represents an advance in the art with respect to the mentioned patent applications because the invented product is of increased tensile strength in a desired direction and is of other advantageous characteristics and may be produced efficiently and automatically. Also, as will be seen from the present specification, the invented product, method, use and modifications thereof are additionally advantageous.

In accordance with the present invention there is provided a porous polyfluoroalkylene sheet, suitable for use as a separator in an electrolytic cell, having a porosity in the range of 70 to 90%, a thickness in the range of 0.2 to 3.5 mm. and at least one of (a) an A X-ray ratio in the range of 0.1 to 0.35 and (b) a B X-ray ratio in the range of 0.75 to 0.98. Preferably the A X-ray ratio is in the range of 0.1 to 0.3, the $B_2$ X-ray ratio is in the range of 0.75 to 0.98 and the $B_1$ X-ray ratio is in the range of 0.1 to 0.32. Also within the invention are: a separator for an electrolytic cell made from a described sheet; an electrolytic cell containing such a separator, usually a plurality thereof; a method of electrolyzing brine, utilizing such separator(s) and such a cell; a method of manufacturing the described polyfluoroalkylene sheet of improved tensile strength; and a method of selecting microporous sheets useful as electrolytic cell separators.

The invention will be readily understood from the present specification, taken in conjunction with the drawing, in which:

FIG. 3 is a schematic illustration of an electrolytic cell for the electrolysis of brine, with a separator of this invention in place therein;

FIG. 4 is a perspective view of a portion of a sheet of this invention, with the thickness thereof exaggerated, showing the direction of X-ray impingement for obtaining a Debye-Scherrer pattern, from which the A ratio of the sheet may be determined;

FIG. 5 is a view like that of FIG. 4, but with the direction of the X-ray beam being changed so as to produce a pattern from which the $B_1$ ratio may be determined; and FIG. 6 is a view similar to those of FIGS. 4 and 5 with the X-ray beam being in a direction so that the $B_2$ ratio may be determined from the resulting pattern.

Figure 1:
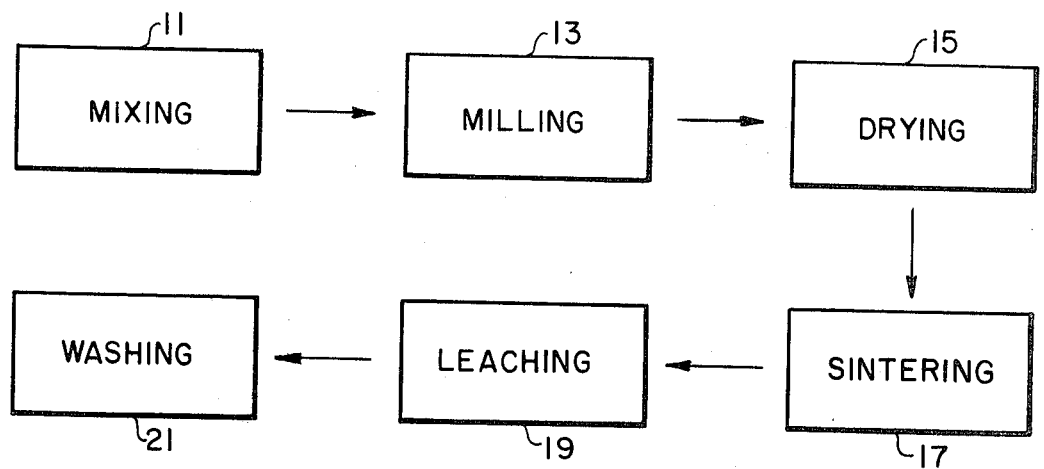
FIG. 1 is a processing or flow diagram representing steps in the manufacture of the porous sheets of this invention.
Figure 2:
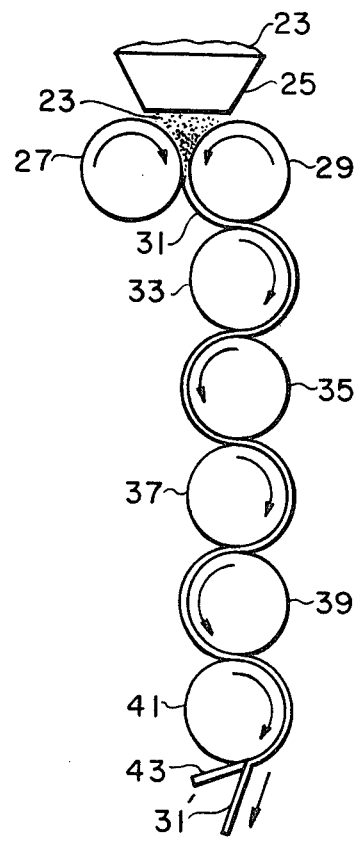
FIG. 2 is an end elevational representation of a multiple roll mill, suitable for making the present sheets, with portions thereof removed to show the relationships of the rolls.

As is shown in the flow sheet of FIG. 1, initially the components of the mixture to be converted to sheet form, including polyfluoroethylene resin powder in sinterable form, particulate pore-former and suitable lubricant (or contact promoting agent) are mixed together in a blending apparatus, such as a vee or twin sheet blender or other mixing apparatus, in a mixing operation, represented by numeral 11, following which the mix is milled in a milling operation 13 wherein both compressive and shear forces are applied to the mixture and in the sheet made the polymeric material (and often the particulate pore-forming material, too) is oriented longitudinally (in the direction of the sheet formed, corresponding to the direction in which it is milled). Often it will be preferable, as illustrated in FIG. 2, for the milling to be effected with continuous transfer to subsequent rolls and with sequential diminutions in sheet thicknesses. Such is effectable by having the subsequent rolls moving faster (lineal speed), which can be arranged by changing rotational speeds and/or diameters. Instead of using the illustrated continuous process the material being milled may be banded on a roll, removed therefrom and reprocessed in a similar manner. After completion of milling and removal of the sheet from a mill roll, as by a knife, as shown in FIG. 2, the sheet is dried to remove any volatile materials present, which might otherwise interfere with a subsequent sintering operation. Such drying is effected at an elevated temperature but below the temperature for sintering the polyfluoroethylene particles together. After the completion of drying step 15 the sheet is sintered by subjecting it to an elevated temperature sufficiently high for the polyfluoroethylene powder to fuse together at contact points. Sintering operation 17 can be carried out in an oven or between heating plates or may be effected continuously by passing the sheet between heating rolls, after which the sheet is cooled. The cooled sheet, from which volatiles have been removed but which still contains the removable particulate pore-forming material, is then subjected to a leaching operation 19, whereby the pore-forming particles are removed, after which the leaching medium is removed in a washing operation 21. No separate cooling step is illustrated in the flow diaphragm between the sintering and leaching operations because it is possible to cool the sintered product by means of the leaching medium. Similarly, the drying operation may be conducted as a preliminary part of the sintering process. Also, the washed sheet may be used directly, may be stored moist, or may be dried before use, and sometimes washing may be omitted.

In FIG. 2 there is shown a mixture 23 of the resin particles, pore-forming particles and lubricant in feeding trough 25 and being fed from said trough to between rolls 27 and 29, on one or both of which it forms a sheet 31, which is continually thinned down by sequential passage between adjacent rolls 33, 35, 37, 39 and 41, from the last of which it is removed in final form at the bottom of the roll as sheet 31', by knife 43 or other suitable means. The curved arrows indicate the directions in which the rolls move. Instead of utilizing a mill of the type schematically illustrated the thinnings of the sheet may be obtained by sequential passes thereof through a two-roll mill or a mill of a suitable number of rolls other than the number of rolls in the mill illustrated, or other equivalent compression-shear means may be employed.

In FIG. 3 there is schematically illustrated a simple form of electrolytic cell 45 for the electrolysis of brine but it is to be understood that the present separators may also be used as replacements for asbestos diaphragms and membranes in cells of such types. Cell 45 includes cell body 47, anode 51, cathode 49 and microporous separator 53 (of this invention), separating the cell into anolyte compartment 57 and catholyte compartment 55, with electrolyte 59 therein including anolyte 63 and catholyte 61. A hydrostatic head is represented by the increased height of the anolyte, which provides a driving force for brine movement. A source of direct current 58 is connected to the electrodes by conductors 60 and 62. Sodium hydroxide solution produced at the cathode is withdrawn through exit 67 and brine is added through inlet port 65. Chlorine is removed through outlet 71 and hydrogen is taken off at outlet 69. Water and/or sodium hydroxide solution may be added through line 67, at least on initial startup, and if desired, a separate line may be included for such additions.

In FIG. 4 there is illustrated the impingement of an X-ray beam, represented by numeral 77, normal to a major surface of a portion of a microporous separator, diaphragm or membrane 75 of this invention (after leaching out of pore-former and after washing). Arrow 79 indicates a longitudinal or rolling and milling direction of the separator, in which the polymer is formed and intentionally oriented. A similar view is shown in FIG. 5, where the direction of impingement of X-ray beam 77' is along a transverse axis. In FIG. 6 the direction of X-ray beam 77" is in the rolling direction. The X-ray impingement patterns may be obtained on thinner sections of the sheets than are illustrated in FIGS. 4–6, which are shown as relatively thin and flat to indicate sheet form and illustrate the significance of the measurements made with respect to the orientation of the polyfluoroethylene. The pattern resulting from the X-ray impingement of FIG. 4 results in an A X-ray ratio and those of FIGS. 5 and 6 result in $B_1$ and $B_2$ ratios, respectively.

Although polytetrafluoroethylene (PTFE) is the highly preferred polymer of this invention it is also within the invention to utilize various other fluorinated polymers which are thermoplastic and capable of being sintered as described. These include fluoro, perfluoro and chlorofluoro ethylenes and lower alkylenes (2 to 4 carbon alkylenes). Among such homopolymers and copolymers are polychlorotrifluoroethylene, polyfluoroethylenepropylene, polyfluoro-lower alkoxyethylene and copolymers of chlorotrifluoroethylene and ethylene. Also useful are polyvinyl fluoride and polyvinylidene fluoride and in some instances such polymers (or the corresponding resins) may be mixed with corresponding chlorides. Among other polymers which may sometimes be utilized, wholly or preferably partly, are polyvinyl chloride, post-chlorinated polyvinyl chloride, polyethylene, polypropylene and polysulfones. However, because the fluoropolymers have much greater resistance to severe electrolytic cell conditions their life expectancies are much greater than those of the other polymers and for this and other reasons they are highly preferred.

For simplicity, in the description in this specification, although various other polymers, especially fluoropolymers, may be utilized, too, reference will be to the polymer of choice, polytetrafluoroethylene (PTFE). Although the polyfluoroethylene may be of any suitable molecular weight it will usually be a PTFE of a number average molecular weight in a range of about 100,000 to 100,000,000, preferably 200,000 to 50,000,000 and more preferably 300,000 to 1,000,000.

The polytetrafluoroethylene may be of a suitable particle size or size range but will usually be of average diameters in the range of about 10 to 1,000 microns, preferably 30 or 35 microns to 500 microns, e.g., 35 microns and 450 microns average diameters. Such material is available from E.I. DuPont de Nemours & Co. as, for example, Teflon ® TFE—Fluorocarbon Resin 6A, and Teflon TFE—Fluorocarbon Resin 7A. Surprisingly, such low average particle sizes as 35 microns have been found suitable for the present calendering techniques, whereas such materials have previously been found useful mainly in molding processes.

The solid particulate pore-forming material utilized is one which, in addition to being insoluble in the PTFE, is also capable of withstanding the sintering temperature without objectionable distortion. It is also insoluble in the lubricant employed and is preferably one which is also insoluble in water. However, it is removable by suitable chemical and physical means which will not damage the polytetrafluoroethylene, such as leaching with a mineral acid, e.g., hydrochloric or nitric acids, or by vaporization or sublimation. Illustrative of such materials are starch, for example, cornstarch and/or potato starch, and water insoluble inorganic bases, oxides or carbonates, such as calcium carbonate, colloidal alumina, metallic oxides, etc. Alternatively, water soluble additives may be utilized, such as sodium carbonate, sodium chloride, sodium borate, etc. However, when using such materials the water content of the lubricant should be minimized. Such materials preferably have a well defined particle size. Calcium carbonate is preferably employed and the preferred $CaCO_3$ is one wherein the particles are of weight average diameter or equivalent diameter between 6.5 and 150 microns, e.g., 20 to 100 microns. Generally, the pore-forming material has particle diameters substantially all within the range of from about 1 to about 500 microns. Lower average particle diameters in the submicron and amicron ranges, may result in objectionable porosities and smaller pores, which can be blocked during use. The amount of pore-forming additive utilized will depend on the permeability or porosity desired in the final separator. Thus, the weight ratio of pore-former to polytetrafluoroethylene may be, for example, from about 10:1 to 1:1, and preferably is from about 7:1 to 2:1, e.g., 6:1 to 3:1. To obtain a porosity greater than 70 percent, which has been difficult when using prior art techniques, is a goal in the art. By the present invention it has been found possible readily to obtain porosities greater than 70 and 75%, even 80 percent and more without great difficulty. Although in some instances it will be possible to manufacture microporous sheets and separators without the use of a lubricant and orient the polymeric material thereof by the method described in this invention so as to produce products of the characteristics recited, employment of such a lubricant is very highly desirable and facilitates manufacture of a satisfactory product. Otherwise, milling and other processing techniques will usually be effected with greater difficulties being encountered. Techniques have been described in the art for making porous sheets without the use of particulate pore-forming materials. Such sheets and those made with pore formers are processable in accordance with the method of this invention and the described processing operations may be effected on the sheets before or after creations of the voids therein. However, generally it is highly preferable to utilize the lubricant and particulate pore formers, the latter of which have previously been described.

Kerosene, other hydrocarbons, water and other aqueous media have been mentioned in the prior art as useful lubricants for the processing of mixtures of PTFE and pore-forming particulate solids. However, while these are useful, as was mentioned in Ser. No. 891,987, previously referred to herein, the fluorinated surface active agents, especially perfluoroalkyl substituted materials of such type, are highly preferred. Also, while such materials are available as anionic, cationic and amphoteric surface active agents, the corresponding nonionic surface active agents of this type are much preferred. The nonionic fluorosurfactants, such as that sold by E.I. DuPont de Nemours and Company as Zonyl ® FSN, may be considered as derivatives of a conventional nonionic surface active agent or detergent which is a condensation product of polyoxy lower alkylene, such as polyoxyethylene, polyoxypropylene, polyoxybutylene or mixtures thereof, with an alkanol, with the hydrocarbon chain of the alkanol being fluorinated, preferably perfluorinated. Such chain may be of any suitable length, e.g., 4 to 20 carbon atoms and it is considered that it is preferable for it to be 6 to 10 carbon atoms long. Further descriptions of suitable nonionic fluorosurfactants may be found in U.S. patent application Ser. No. 064,616, a continuation-in-part of Ser. No. 891,987, which was filed in the Patent and Trademark Office on the same date as the present application. Anionic, cationic and amphoteric fluorosurfactants are also sold by DuPont under the Zonyl trademark, as Zonyl FSP, FSC and FSB, respectively. These are corresponding ammonium fluoroalkyl phosphates, fluoroalkyl dimethyl sulfate quaternary salts and fluoroalkyl substituted betaines, respectively. The preferred nonionic surface active agent of this type is a perfluoroalkyl polyoxyethylene glycol and it is considered best for the nonionic surface active material to contain from 7 to 20 ethylene oxide units per mol, e.g., 8 to 14, as in the continuation-in-part application mentioned.

The fluorinated surfactants, being organic in nature and containing fluorine, as does the polytetrafluoroethylene resin, have an affinity for the PTFE and it is considered that they lower surface tensions of solutions and improve the ready "wetting" of the polytetrafluoroethylene particles more than other surface active agents, such as non-fluorinated detergents and wetting agents. Also, because of their fluorine content, they possess a high degree of chemical and thermal stability. The Zonyl types of nonionic fluoro-surfactants described are available in liquid form, containing 25 to 50% of solids, with the balance being an isopropanol/water diluent. Such balances do not interfere with milling or with the effects of the surface active compounds in the relatively small percentages usually employed. The fluorosurfactants assist in producing a uniform blend and dispersion of the pore-forming particles, such as those of calcium carbonate, in the PTFE resin composition being processed. Although the fluorosurfactants mentioned are highly preferred lubricants for the processing of the sheets of this invention they may be employed in conjunction with other known lubricants for such purpose and in many instances may be replaced by them and the product resulting will still be better than other such products differently processed and of different final characteristics, because of the processing technique employed. However, the fluorosurfactant lubricants possess substantial advantages over prior art lubricants, such as are described in Ser. No. 891,987 previously mentioned.

The proportion of lubricant in the mixture to be processed will normally be a minor one, usually being from about 2 to 30%, preferably 3 to 20%, on a solids basis (but accompanying water and alcohol may also be present when the pore-forming material is insoluble or substantially insoluble in such solvents). The most preferred concentration of the fluorosurfactant in the mix will usually be from 5 to 10%. The proportion of pore-former will normally be from 40 to 95%, preferably 65 to 92% of the mix and the proportion of resin will normally be from 3 to 40%, preferably 5 to 25%, also on solids bases.

In addition to the materials mentioned, which may be the only components employed to make the sheets of this invention, it may be desirable sometimes to incorporate other ingredients in the blend which are not to be removed when the rolled sheet is treated to leach out the pore-forming substance. Examples of such components may include particulate fillers, generally inorganic materials such as titanium dioxide, barium sulfate, asbestos, graphite, and in some instances, alumina. Suitably, such fillers will have a particle size lower than 10 microns and often preferably in the amicron and submicron range. The presence of such fillers may give the product additional strength and firmness. In general the total proportion thereof will be from 1 to 25%, when present, preferably 1 to 10%.

The microporous sheets of PTFE of this invention are primarily intended for use as separators in electrolytic cells for the electrolysis of brine to produce chlorine and caustic, but they have other applications, too. In use as a diaphragm, membrane or separator it has been found desirable for the sheets to have a porosity in the range of 70 to 90%, preferably 75 to 90%, a thickness in the range of 0.2 to 3.5 mm., preferably 0.2 to 1.5 mm. and a tensile strength along an axis (normally the longitudinal axis of the sheet being processed) of 5 to 50 or 15 to 50 kg./sq. cm., preferably at least 20 kg./sq. cm., e.g., 20 to 40 kg./sq. cm. Such tensile strengths in a particular plane or direction (usually that along the rolling axis) and other useful physical characteristics have been obtained when the A X-ray ratio is in the range of 0.1 to 0.35, preferably being 0.1 to 0.3 and/or when one of the B X-ray ratios, preferably the $B_2$ X-ray ratio, is in the range of 0.75 to 0.98 and the other B X-ray ratio, usually the $B_1$ ratio, is preferably less than half thereof. The B X-ray ratios are preferably such that the $B_2$ ratio is in the 0.75 to 0.98 range and the $B_1$ ratio is in the 0.1 to 0.48 range, more preferably 0.1 to 0.32 and less than $\frac{1}{3}$ of the $B_2$ ratio. As will be shown later, sheets of the desired X-ray ratios (measured after leaching out of the pore-forming material) are obtainable by processing methods of this invention. Although the desired physical characteristics of the sheet or separator are obtainable when either the A or a B X-ray ratio is obtained in a mentioned range better results may be expected when both such ratios are within the ranges described.

The X-ray ratio is indicative of the comparative crystal orientation or molecular chain orientation of the product. The Debye-Scherrer X-ray diffraction pattern, normally a ring, is of different intensities and the ratio of the minimum to the maximum intensities on the ring relates to the extent of randomness or orientation of the PTFE. For example, if the ring is of the same intensity the crystals or polymer molecules will be random, not aligned, and the same intensity and complete randomness will be indicated by an X-ray ratio of 1. On the other hand, if the crystals were to be perfectly oriented the ring would coalesce to a plurality of bright spots, so that the X-ray ratio would be zero. The diffraction pattern may be measured by any of several methods, of which the intensity and area methods are the more common. Such measuring techniques are known in the art and need not be further described here. Because the direction of milling by the method of this invention (the rolling direction) will be known and because the crystals will normally tend to orient in such direction when subjected to compressive and shear forces, such as those applied in the present milling operations, the A X-ray ratio will be indicative of the relative orientation along the rolling and transverse axes, with more orientation usually being along the rolling, milling or calendering axis. Thus, the lower the A X-ray ratio the greater will be the orientation or alignment of the PTFE crystals in the rolling direction. Similarly, the $B_1$ X-ray ratio compares orientation in the vertical longitudinal plane, as illustrated in FIG. 5, so that the lower $B_1$ ratios usually indicate greater orientations in the rolling direction than along the normal axis. The $B_2$ ratios compare orientations in the transverse vertical plane. The higher such ratios the lower the orientation in such plane, which may be desirable so that strengths of the sheet or diaphragm will be about uniform in that plane, wherein greatest tensile strengths are usually not needed. The randomness, as indicated by the $B_2$ ratio, will be greater than that indicated by the A ratio. In use this may be preferable so as to enable the sheet to withstand the greater tensile forces that may be applied longitudinally. Such forces may be applied vertically and accordingly, in use in such circumstances the rolling axis may preferably be the vertical axis of the installed separator.

To manufacture the present porous sheets or separators the mixture of PTFE, calcium carbonate and Zonyl FSN (or equivalent materials) is made, with or without adjuvants, and is subjected to a compression-shearing operation, such as milling (or calendering). Prior to such treatment the mixture may be formed in suitable mixing equipment, such as twin-shell blender. Initially, powdered materials may be mixed, after which the liquid may be blended in, or other order of addition can be employed. Usually PTFE powder is employed but the PTFE may be in emulsified or other dispersed form, too. After sufficient mixing, often over a period of from 2 to 20 minutes, e.g., 10 minutes, the mixture may be fed between a pair of mill rolls so as to form a band on one or both such rolls, which band may be removed, either manually or automatically and may be fed to other rolls, or may be lifted automatically from one of the banding rolls and sequentially fed between subsequent rolls in a train so as to continuously mill or calender the sheet in a plurality of crystal orienting operations, in which the thickness of the sheet is diminished to desired measurement. Usually the mill rolls are of limited widths so as to confine the material being worked thereon while it is being thinned, thereby increasing working effects. Normally the thickness reduction is to half or less of the initial thickness, preferably to a third or less. Although mixing before milling is desirable, sometimes it is possible to feed the components to the mill and depend on the milling action and any subsequent calenderings to blend them together. It is possible to employ only a two roll mill, repeatedly removing the milled sheet and passing it through a subsequent gap between rolls to subject it to further working and orientation. In various prior art methods after some milling the sheet formed would be folded over on itself one, two or more times and often would be rotated 90° before the next rolling step. The present method does not require such rotations, nor are the foldings needed, although some may be employed. In fact, it is highly desirable for at least the last five millings and sometimes up to the last ten, fifteen or twenty millings to be coaxial so as to improve the strength of the milled sheet along the rolling axis. It will be seen that by utilizing sequentially faster moving rolls, which will take up the item being milled or calendered, one can produce the present sheets without the need for manually removing them from the rolls and subjecting them to folding and rotational movements, although such foldings may desirably be employed. Also, in addition to the operations being simpler and lending themselves more to automatic running and control, the product resulting is better and of greater tensile strength along a desired axis when rotations are limited.

Various speeds of operation may be employed and various reductions of sheet thicknesses may be effected but usually the linear speed of the faster moving of the mill rolls will be about 1 to 50 meters per minute, preferably about 1.5 to 5 meters per minute and the ratio of linear speeds of two adjacent rolls will be in the range of 1:1. or 1.05 to 5:1, preferably being 1.1:1 to 1.5:1 or 2:1. Higher roll speeds may also sometimes be acceptable. Operating temperatures will usually be of 19° to 30° C. but higher and lower temperatures are also acceptable sometimes. Instead of employing a mill of the type illustrated in FIG. 2 other such mills or calenders with fewer or more rolls, e.g., 3 to 20 rolls, may also be utilized, as may be a series of two-roll mills or calenders. Also, other means for effecting comparable shear and orientation may be substituted so as to produce a final oriented sheet product of X-ray ratios of the types set forth herein.

After production of the oriented PTFE sheet it will normally be heated to drive off any volatilizable components thereof, including any water, low boiling solvents and lower boiling portions of the lubricant and adjuvants which may be present. Such initial heating will usually be in the temperature range of 100° to 250° C. and will be conducted for a suitable time to effect such volatilization, which may be from about one minute to five hours, preferably from five minutes to one hour, although by the use of special techniques, such as microwave heating, much shorter times may be employed. Subsequently the PTFE particles are sintered together at a sintering temperature, usually about 320° or 340° to 360° C. for the requisite time, which is normally from thirty minutes to ten hours but again, by utilization of advanced heating methods, including ultrasonic heating, etc., such times may be shortened. Preferred sintering times are in the 1 to 5 hour range. After cooling to room temperature, in the usual case the calcium carbonate particles or other pore-forming materials are removed by suitable processes, including dissolving and volatilizing. For calcium carbonate particles leaching with a suitable mineral acid, e.g., dilute HCl (often 3 to 6 N), is preferred, often accompanied by leaching with dilute nitric acid, e.g., 2 to 5 N $HNO_3$. Upon termination of the leaching operation, which may usually take from one to twenty hours, preferably 2 to 5 hours, to make sure that all the particles have been dissolved and removed, the sheet is washed, usually with water, and is dried and ready for use. Repeated leachings and washings or rinsings may be used to remove all the particulate pore-former.

The product made, of the desired thickness, porosity and tensile strength along its rolling axis, may be employed as a separator for electrolytic cells by cutting the sheet to size and framing it suitably, with the rolling axis normally being vertical or situated so that it faces in the direction in which the greater or greatest tensile forces are to be exerted against it, during installation and/or during use. If desired, to further increase the strength and/or thickness of such a porous sheet, it may be laminated with another such sheet, usually with the major flat surfaces being held together, as by heat or solvent fusion, at a plurality of locations and with the rolling axes thereof crossing at an angle, preferably at 90°. However, such strengthening is not normally necessary and even when it is effected the rolling axes may be parallel so that the major effect of laminating is to increase the thickness of the diaphragm and thereby control its permeability. The thickness of such a laminated product will normally be that resulting from laminating 2 to 5 sheets, each of 0.2 to 1.5 mm. thickness, to produce a laminate 0.4 to 3.5 mm. thick.

After manufacture of the sheets by the present method the quality of the product can be checked by the X-ray method described and the products of the described processes and other processes may be evaluated to determine whether they fall within the A and B X-ray ratio specifications set forth herein. If they do and if they satisfy tensile strength requirements for use they may be employed as separators in cells for the electrolysis of brine.

The microporous separator of this invention, satisfying the A and B X-ray ratio specifications, is employed in a chlor-alkali cell as a diaphragm or separator which divides the anolyte from the catholyte and thereby forms an anode compartment (or anolyte compartment) and a cathode compartment (or catholyte compartment). Although the cell may be made of various materials, steel, glass, bitumen or synthetic organic polymeric plastic interiors are preferred and if the interior is plastic coated the coating is preferably polyvinylidene chloride or chlorinated PVC. Alternatively, plastic cell bodies may be employed, such as those of polypropylene or PVC. The anode is preferably of a noble metal oxide coated onto a valve metal mesh (so-called dimensionally stable anodes or DSA) but may be such as to lower the hydrogen overvoltage, e.g., of noble metal or with porous nickel surfaces, and the cathode is preferably a perforated steel plate although graphite, iron and catalytic cathodes are also useful. The voltage impressed, the cell voltage, will usually be between 2.5 and 6 volts, preferably 2.5 to 5.5 volts and the current efficiency (so-called caustic current efficiency) will be in the range of 70 to 98%, preferably 85 to 98%. The current density is in the range of 0.1 to 0.3 ampere/sq. cm. The brine fed to the cell will usually have a concentration of from 250 to 350 g./l. of sodium chloride and may be either alkaline or acidic, e.g., at a pH of about 3 to 11, and the sodium hydroxide solution taken off normally analyzes from 90 to 210 g./l. of NaOH, e.g., 100 to 160 g./l. The kilowatt hours per electrochemical chlorine unit (kwh/e.c.u.) are in the range of 2,000 to 5,000, preferably being 2,000 to 3,500.

In such electrolytic cell uses it is found that the microporous separators satisfactorily replace conventional asbestos diaphragms and prevent undue mixings of anolytes and catholytes, while allowing transfers of brine through them toward the cathodes. The separator withstands the conditions of use in the electrolytic cell, is readily installed without tearing and maintains its shape and strength during use despite the strain on the separator due to its weight and expansion and contraction forces and stresses due to flow patterns. Similarly, when a laminate or composite of two or three thicknesses of sheets is employed, with sheet axes parallel or with one crossing the axis or axes of the other one or two sheets, satisfactory operations are obtainable and the strength of the separator is further increased to withstand use strains.

The following examples illustrate the invention but do not limit it. Unless otherwise indicated all parts are by weight and all temperatures are in °C.

EXAMPLE 1

50 Grams of polytetrafluoroethylene No. 7A powder, obtained from E. I. DuPont de Nemours & Company, are dry mixed with 247 grams of calcium carbonate (Dryca-flo 225AB, sold by Sylacauga Calcium Products, Inc., previously screened by roto-tap sifting so as to be in the range of 43 to 53 microns) in a V-shape or twin-shell blender for one minute and then 65 milliliters of Zonyl FSN, a nonionic fluorosurfactant of the type previously described in the specification, are admixed therewith and the mixture is blended together in the twin shell blender for an additional five minutes. This material is then repeatedly milled on a two-roll mill, the rolls of which are 20 cm. wide and of diameters of 10 cm. The mill speed is 150 cm./minute (the slower roller) and the ratio of roller diameters (and lineal velocities) is 1.2:1. Steps of the milling procedure and the corresponding gap settings are given below.

| Milling Procedure | Gap Setting (mm.) |
| --- | --- |
| Load, band, remove single sheet | 1.1 |
| Fold in half, mill | 1.4 |
| Fold in half, mill | 1.9 |
| Thin | 1.4 |
| Thin | 1.1 |
| Thin | 0.7 |
| Fold in fourths, orient 90°, mill | 1.9 |
| Fold in half, mill | 2.7 |
| Thin | 2.3 |
| Thin | 1.9 |
| Thin | 1.4 |
| Thin | 1.1 |
| Thin | 0.7 |
| Fold in half, mill | 1.9 |
| Thin | 1.4 |
| Thin | 1.1 |
| Thin | 0.7 |
| Fold in half, mill | 1.9 |
| Thin | 1.4 |
| Thin | 1.1 |
| Thin | 0.7 |
| Thin | 0.3 |

After milling, the sheet is heated and is held for two hours at a temperature in the range of 100° to 250° C. (which may sometimes be considered to be a preliminary part of the sintering process) and volatiles are driven off, after which it is sintered at a temperature of 330° C. for two hours. It is then leached over a period of five hours sequentially by plural treatments with dilute hydrochloric acid (6 N) and dilute nitric acid (5 N), with intermediate water rinsings, is water washed over a period of one hour, is air dried with room temperature air over a period of two hours and is then ready for use.

Before use a portion of the sheet is subjected to X-ray beams and the diffraction patterns are photographed. The rings resulting are measured by both intensity and area methods so as to obtain A, $B_1$ and $B_2$ ratios. By the intensity method the A, $B_1$ and $B_2$ ratios are 0.21, 0.22 and 0.95, respectively whereas by the area method they are 0.20, 0.23 and 0.96, respectively. The porosity of the sheet, measured by a mercury penetration porosimeter, is about 80% and the tensile strength, measured along the rolling axis, is 35 kg./sq. cm.

The microporous PTFE membrane or separator prepared in accordance with the method of this example is made wettable and is employed as the diaphragm or separator in a glass walled laboratory chlor-alkali cell like that schematically shown in FIG. 3. The anode of the cell is a titanium mesh coated with a noble metal oxide and the cathode is a perforated steel plate. The PTFE separator sheet is placed between the anode and the cathode. Sodium chloride brine, at an NaCl concentration of 320 g./l. and a pH of 4, is initially placed in both anolyte and catholyte compartments and subsequently is fed to the anolyte compartment. A current density of 0.23 ampere/sq. cm. is applied to the electrodes. Chlorine is produced at the anode and hydrogen gas and sodium hydroxide are produced at the cathode. The anolyte compartment is equipped with a hydrostatic head so that some of the brine is allowed to flow continuously through the separator during the course of the electrochemical reaction. The catholyte compartment contains a drain opening so that sodium hydroxide produced is withdrawn thereby. The amount of caustic produced over a 16 hour time period is used for calculation of the current efficiency of the cell. Chlorine produced is vented to a scrubber and hydrogen is vented to an exhaust system. The cell operation is at a temperature of about 85° C. The cell voltage is 5.3 and the current efficiency is 76% at 150 g./l. NaOH production. The kwh/e.c.u. at 150 g./l. NaOH is 4,750.

In modifications of this experiment the milling procedure is varied by including 90° turns in the first four folding operations but subsequently such foldings are avoided. Alternatively, the milling procedure is effected on a six roll mill in which the initial band thickness of 1.1 mm. is reduced to 0.3 mm. stepwise. In all three cases the sheets obtained will have A and B ratios within the broader ranges previously mentioned and are satisfactory for use in the electrolytic cell under the conditions described. Similarly, when the product of this example is laminated to 2 or 3 thicknesses, with at least one such sheet crossing another such sheet at an angle of about 90°, the strengths of the products are increased and porosities are not severely adversely affected.

EXAMPLE 2

The procedure of Example 1 is followed with respect to materials employed, proportions and mixing conditions. However, the mill employed is a two roll mill wherein the rolls speed ratio is set at 1.4:1. The speed of the slower of the rolls is the same as that in Example 1 but the milling procedure is modified, as follows.

| Milling Procedure | Gap Setting (mm.) |
|---|---|
| Load, band, remove single sheet | 1.1 |
| Fold in half, mill | 1.4 |
| Fold in half, mill | 1.9 |
| Thin | 1.4 |
| Thin | 1.1 |
| Thin | 0.7 |
| Fold in half, mill | 1.9 |
| Fold in half, mill | 1.9 |
| Thin | 1.4 |
| Thin | 1.1 |
| Fold in half, mill | 1.9 |
| Thin | 1.4 |
| Thin | 1.1 |
| Thin | 0.7 |
| Fold in half, mill | 1.9 |
| Thin | 1.4 |
| Thin | 1.1 |
| Thin | 0.7 |

The sheet made is dried, sintered, cooled, leached, water washed and dried according to the method described in Example 1. The A and B X-ray ratios thereof are determined by the method described in that example. The A, $B_1$ and $B_2$ ratios are 0.42, 0.32 and 0.84, respectively, by the intensity method and 0.38, 0.34 and 0.84, respectively, by the area method. The porosity and tensile strength of the sheet made are within the range of such properties previously described as acceptable for use as an electrolytic cell diaphragm. When utilized in such application in a cell like that described in Example 1, satisfactory installation is effected and efficient electrolysis of brine is obtainable, like that of such example. When the sheet resulting is laminated with another such sheet with the rolling axes at right angles and the major surfaces in contact and held together by heat sealing at a plurality of locations thereof (not amounting to more than 5% of the total area), a useful electrolytic diaphragm or separator is obtained, of increased strength along both major axes. Instead of heat sealing other suitable fastening means and methods may be employed.

When, instead of polytetrafluoroethylene there is incorporated polychlorotrifluoroethylene, polyethylene or chlorinated polyvinyl chloride as the resin and kerosene as the lubricant, with calcium carbonate still being employed as the pore-forming material, and when the milling procedures are like those previously described in this example, porous sheets are obtainable. However, the processes of the present examples and the products thereof are better. The perfluorinated resin products are of superior resistance to chemical deterioration during use and it is preferred that instead of kerosene a fluorosurfactant, preferably the nonionic fluorosurfactant utilized in this example, be employed, for safety's sake and for the improved blending properties thereof with respect to the fluorinated resins used.

The microporous separator made in this example, when utilized to replace a standard asbestos diaphragm, functions in essentially the same manner and may be used for considerable periods of time without the necessity for replacement. In the event that any build-up of insoluble material takes place in the pores of the separator such is correctable by repeated leachings and washings with appropriate reagents or solvents so as to remove such deposits. The separators are of sufficient strength so as to withstand dismantling, the described treatment and replacement, without tearing or objectionable distortion and are often of better properties than asbestos.

To save having to test the microporous separators made by actual use in electrolytic cells the A, $B_1$ and $B_2$ X-ray ratios may be determined for the products and if these are within the described ranges the separators made by the described method will generally be satisfactory for use in electrolytic cells for the electrolysis of brine and may be selected for such use.

Also, in this example there may be substituted laminated separators, with two or three sheets aligned, cross-positioned or partially aligned and partially cross-positioned. Such resulting separators will be of improved tensile strengths and satisfactory porosities.

The invention has been described with respect to illustrative examples and working embodiments thereof but is not to be limited to these because it is evident that one of skill in the art with the present specification before him will be able to utilize substitutes and equivalents without departing from the invention.

What is claimed is:

1. A method of making a porous polyfluoroalkylene sheet of improved tensile strength, suitable for use as a separator in an electrolytic cell, which comprises working a mixture of polyfluoroethylene particles, removable pore-forming particulate material and a lubricant to produce a sheet having at least one of (a) an A X-ray ratio in the range of 0.1 to 0.35 and (b) a $B_1$ or $B_2$ X-ray ratio in the range of 0.75 to 0.98, removing volatiles therefrom, sintering the polyfluoroethylene particles and removing any remaining lubricant and the pore-forming material.

2. A method of making porous polytetrafluoroethylene sheet according to claim 1 wherein the working is of a mixture of polytetrafluoroethylene, removable pore-forming particulate material and lubricant and is by roll milling to produce a sheet, such milling is effected to decrease the thickness of the sheet stepwise to from 0.2 to 3.5 mm. from a thickness at least twice that much so as to result in a sheet having a $B_2$ X-ray ratio in the range of 0.75 to 0.98 and a $B_1$ X-ray ratio less than ½ thereof, volatiles are removed therefrom by heat drying and the pore-forming material is removed therefrom by acid leaching.

3. A method according to claim 2 wherein the mixture is loaded onto a mill to form a band on a mill roll, said band is subsequently thinned by milling in a plurality of steps, including at least five thickness-reducing steps immediately before completion of such milling wherein the milling axis of the milled sheet is maintained substantially constant and parallel to mill roll movement and the sheet thickness resulting is in the range of 0.2 to 1.5 mm.

4. A method according to claim 3 wherein the pore-forming particulate material is calcium carbonate and the lubricant is a nonionic flurosurfactant.

5. A method according to claim 4 wherein the mixture comprises from 65 to 92% of calcium carbonate of particle diameters in the range of about 1 to 500 microns, 5 to 25% of polytetrafluoroethylene powder of particle size in the range of 35 to 500 microns and 5 to 10% of a nonionic fluorosurfactant which is a perfluoro-higher alkyl polyoxyethylene glycol wherein the higher alkyl is of 4 to 20 carbon atoms and the polyoxyethylene glycol portion is of 7 to 20 ethoxy groups per mol, volatilizable components of the sheet after milling are removed by heating to a temperature in the range of 100° to 250° C., sintering is effected at a temperature of about 340° to 360° C. and calcium carbonate particles are removed by leaching with hydrochloric acid.

6. A method according to claim 5 wherein milling is effected in a multiple roll mill with parallel rolls and diminishing clearances between them.

* * * * *